US012218998B1

(12) United States Patent
Ostiguy et al.

(10) Patent No.: US 12,218,998 B1
(45) Date of Patent: Feb. 4, 2025

(54) METHOD, SYSTEM AND APPARATUS FOR MANAGING MULTIPLE INPUT STREAM REQUESTS FOR A SINGLE NETWORK STREAM

(71) Applicant: Matrox Graphics Inc., Dorval (CA)

(72) Inventors: Jean-Jacques Ostiguy, Sainte-Agathe-des-Monts (CA); Charles-Michel Barry, Lasalle (CA)

(73) Assignee: Matrox Graphics Inc., Dorval (CA)

( * ) Notice: Subject to any disclaimer, the term of this patent is extended or adjusted under 35 U.S.C. 154(b) by 479 days.

(21) Appl. No.: 17/553,447

(22) Filed: Dec. 16, 2021

Related U.S. Application Data

(60) Provisional application No. 63/127,141, filed on Dec. 17, 2020.

(51) Int. Cl.
*H04L 65/612* (2022.01)
*G06F 9/50* (2006.01)
*H04L 65/1069* (2022.01)

(52) U.S. Cl.
CPC .......... *H04L 65/612* (2022.05); *G06F 9/5016* (2013.01); *H04L 65/1069* (2013.01)

(58) Field of Classification Search
CPC .. H04L 65/612; H04L 65/1069; G06F 9/5016
See application file for complete search history.

(56) References Cited

U.S. PATENT DOCUMENTS 7,142,509 B1 * 11/2006 Rovner ................. H04L 65/611
370/428
2023/0079452 A1 3/2023 Lafferty

* cited by examiner

*Primary Examiner* — Wissam Rashid
(74) *Attorney, Agent, or Firm* — Build IP, LLC; Robert V. Donahoe

(57) ABSTRACT

A method for managing requests for input streams associated with at least one incoming network stream received from a network interface. The input streams include at least one of video data, audio data and ancillary data. The method includes receiving a request for an input stream associated with a network stream identifier and determining whether the network stream identifier associated with the input stream matches an existing network stream identifier, the existing network stream identifier associated with at least one existing input stream. The method further includes: if a match is found, associating the input stream and the at least one existing input stream with a common area of memory; and if a match is not found, associating the input stream with a first area of memory that differs from a second area of memory that is associated with the at least one existing input stream.

32 Claims, 8 Drawing Sheets

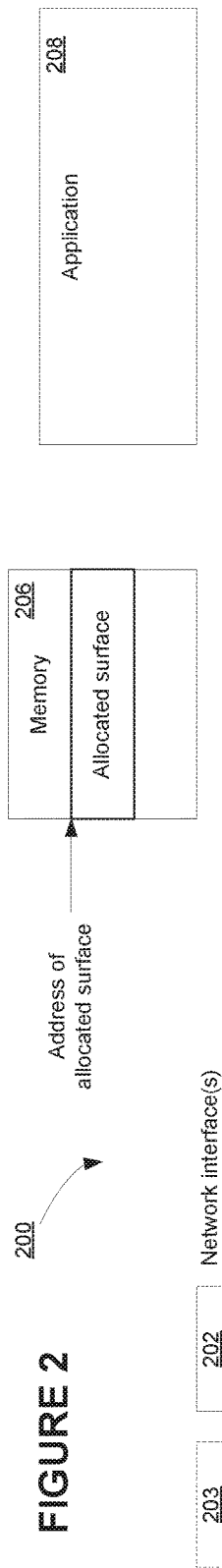

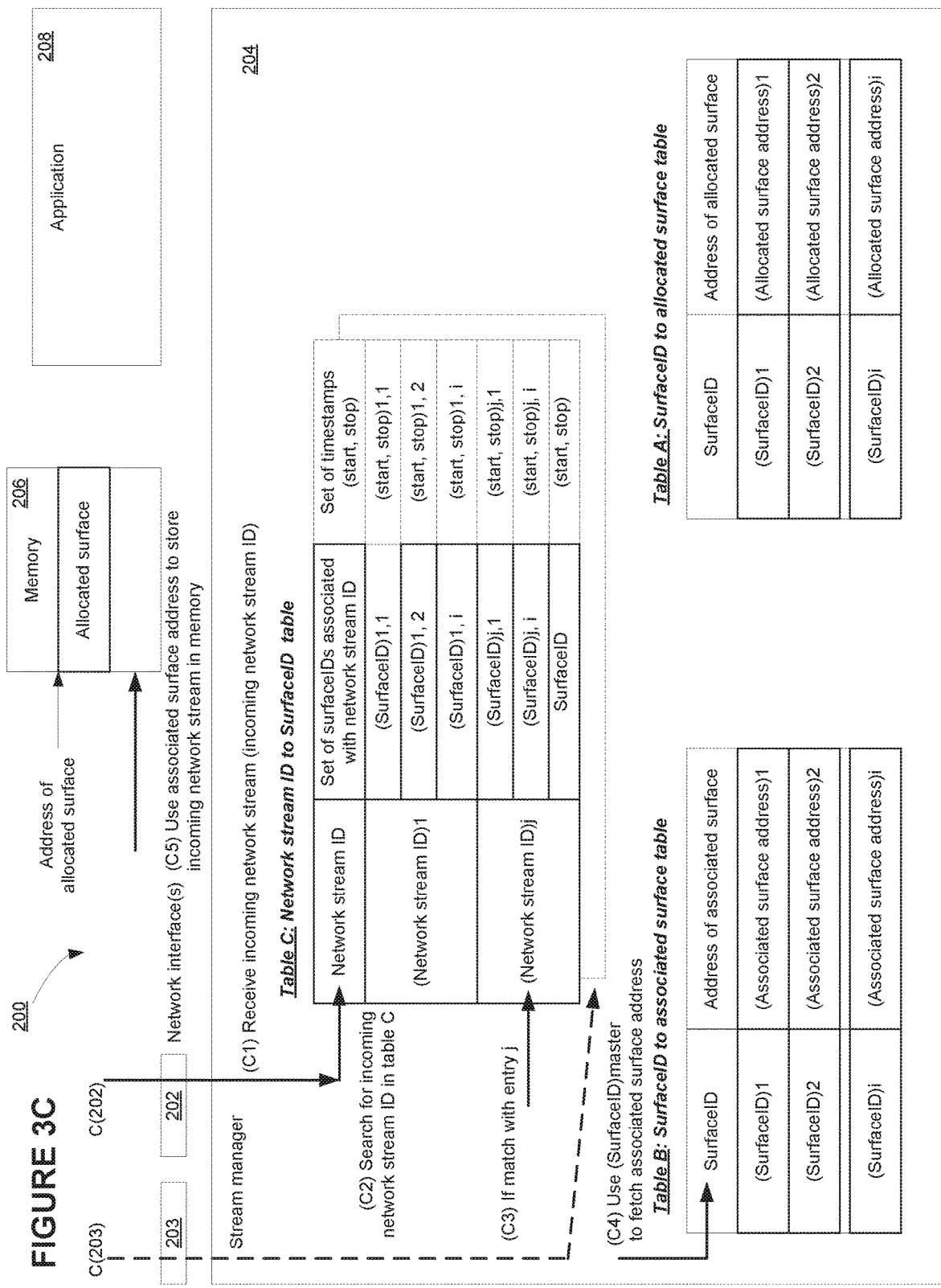

METHOD, SYSTEM AND APPARATUS FOR MANAGING MULTIPLE INPUT STREAM REQUESTS FOR A SINGLE NETWORK STREAM

BACKGROUND OF INVENTION

1. Field of Invention

This invention relates generally to processing data (video, audio, and/or ancillary data) provided in an Internet Protocol (IP) format. More specifically, at least one embodiment relates to a method, system and apparatus for managing multiple input stream requests for a single network stream.

2. Discussion of Related Art

Video processing systems are employed in various fields such as broadcasting. These video processing systems often include a host system running one or more applications that receive video input streams and generate a video output stream using hardware including, for example, a peripheral video input/output card.

Historically, SDI format was the leading format for a digital video interface. Today, however, Internet Protocol is often employed to communicate streams of data packets including any one of or any combination of video data, audio data and ancillary data. Each network stream also includes a network stream identifier (such as a MAC address) used to identify the network stream. According to these approaches, an IP network stream is communicated via a network switch to one or more network interface controllers (NICs) that connect the host system to the network, for example the Internet.

Generally, a network switch will not resend a network stream packet to a network interface, if it has already sent the network stream packet to the network interface. That is, the network switch operates to transmit the network stream packet a first time that is not repeated. For example, a first video feed can be identified by a network stream identification that distinguishes the first video feed from other network streams (including any of video, audio or ancillary data) that are communicated over the network to the NIC. In this example, while the first video feed may be received on a continuous basis, the network switch does not resend packets of video data from the first video feed once they are transmitted a first time.

Applications operating on the host system communicate requests to retrieve an input stream for the application where the input stream includes data from a known network stream uniquely identified by the network stream identifier. Where a single application has a single request for the data (for example, a known sequence of video frames), the host system operates to associate the input stream with data provided by the network stream.

The preceding approach becomes problematic where the same data is required for more than one input stream. For example, the host system can have two applications operating independently from one another (e.g., having separate memory addressing spaces) where each application requires the same data from a network stream. Prior approaches do not permit the preceding. Further, prior approaches can result in a failure of one application in these circumstances because the other application is already using the data. The same situation can also result where multiple input streams for the same application request the same data from a network stream.

One prior approach attempted to address these shortcomings by writing the same data from a network stream to multiple areas of memory. According to this approach, the different applications running on the host system were provided access to one of the memory-locations where the data was stored. However, this approach is memory intensive, requires high memory bandwidth and therefore not desirable.

SUMMARY OF INVENTION

Therefore, there is a need for methods, systems and apparatus that can associate multiple input streams with a single network stream. Embodiments described herein facilitate the preceding to allow multiple input streams for one or more host applications to retrieve the same network stream for processing. Some of these embodiments employ a stream manager to generate a network stream identifier table that organizes and tracks the association between multiple input streams, multiple network streams and associated areas of memory. By associating input streams with areas of memory based on the network stream identifiers, these approaches provide a seamless retrieval of the same network stream data for processing by multiple input streams, and this, whether they are multiple input streams from a single host application, one or more input streams from multiple host applications or one or more input streams from multiple operating systems or virtual machines.

Embodiments of the invention allow multiple input streams to receive (or "listen to") a same network stream that is received once. Further, these approaches avoid writing a received network stream directly to multiple areas of memory (for each of the multiple input streams associated with the network stream) thus reducing the amount of instantaneous memory bandwidth required. By reducing the number of reads and writes to/from areas of memory, the invention reduces memory bandwidth requirements, which allows less expensive memory elements to be used and allows more tasks to be performed with existing memory elements.

According to one aspect, a method is provided for managing requests for input streams associated with at least one incoming network stream received from a network interface. The input streams include at least one of video data, audio data and ancillary data. The method includes receiving a request for an input stream associated with a network stream identifier and determining whether the network stream identifier associated with the input stream matches an existing network stream identifier, where the existing network stream identifier is associated with at least one existing input stream. The method further includes: if a match is found, associating the input stream and the at least one existing input stream with a common area of memory; and if a match is not found, associating the input stream with a first area of memory that differs from a second area of memory that is associated with the at least one existing input stream.

According to another aspect, a non-transitory computer-readable medium is provided. The computer-readable medium includes computer program instructions executable by at least one computer processor to perform a method of managing requests for input streams associated with at least one incoming network stream received from a network interface. The input streams include at least one of video data, audio data and ancillary data. According to various embodiments, the method includes receiving a request for an input stream associated with a network stream identifier and determining whether the network stream identifier associated with the input stream matches an existing network stream identifier, where the existing network stream identifier is associated with at least one existing input stream. The method further includes: if a match is found, associating the input stream and the at least one existing input stream with a common area of memory; and if a match is not found, associating the input stream with a first area of memory that differs from a second area of memory that is associated with the at least one existing input stream.

One of ordinary skill in the art will understand that the act of associating the input stream and the at least one existing input stream with a common area of memory may include associating either one or both of the input stream and the at least one existing input stream with a common area of memory such that, as a result, both the input stream and the at least one existing input stream are associated with the common area of memory.

As used herein, the term "common" when referring to any of an area of memory, a network stream and a network stream identifier refers to the same area of memory, the same network stream and the same network stream identifier, respectively. One of ordinary skill in the art based on the disclosure herein will recognize that a first input stream, a second input stream and any other input streams that include a request for a network stream identified by the same network stream identifier are associated with a common area of memory in various embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 illustrates a system for managing requests for input streams associated with network streams received from a network interface in accordance with a further embodiment;

FIGS. 3A-3E illustrate the system of FIG. 2 including process flows in accordance with one embodiment.

DETAILED DESCRIPTION

Figure 1:
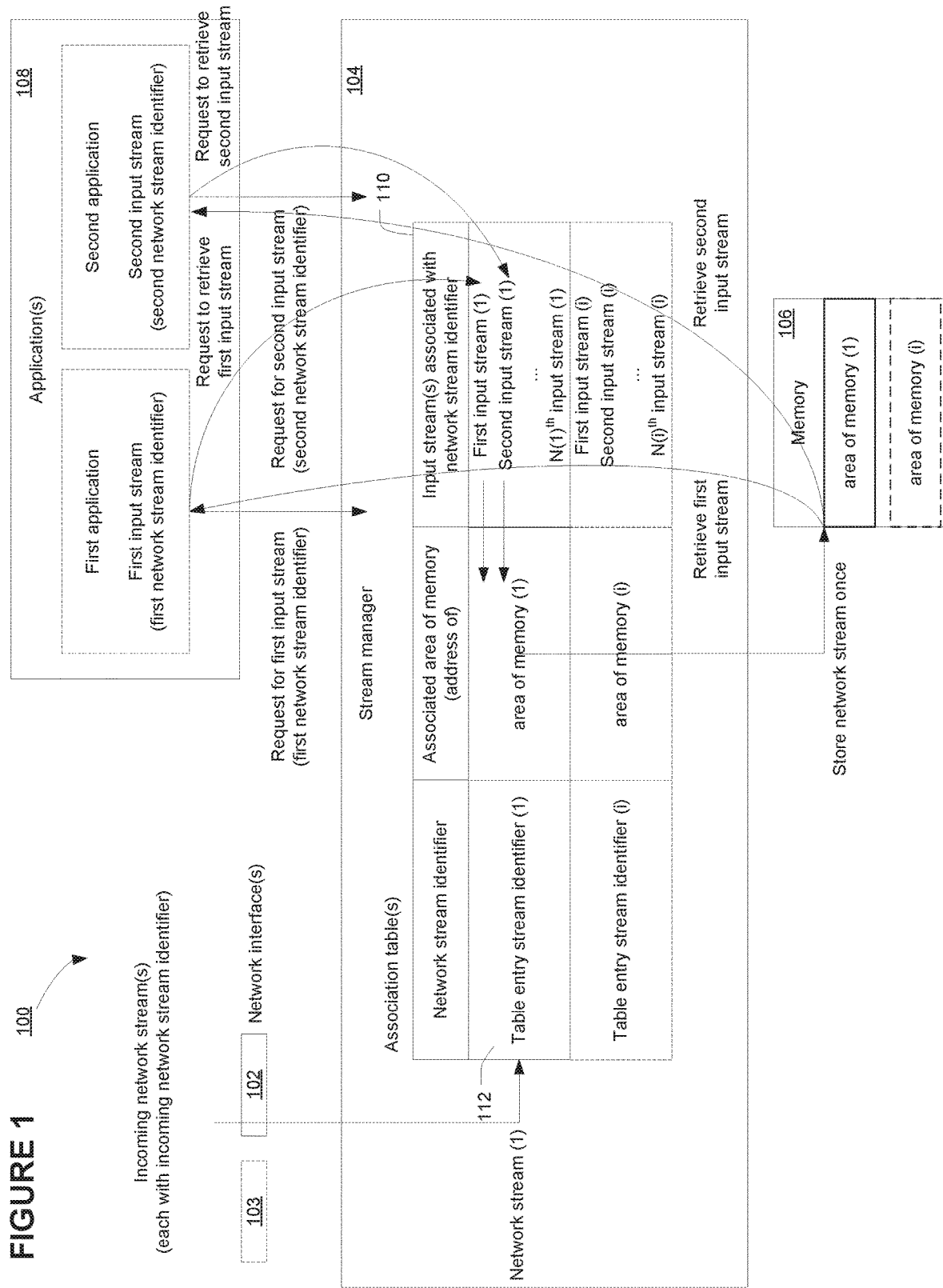
FIG. 1 illustrates a system for managing requests for input streams associated with network streams received from a network interface in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring now to FIG. 1, a system 100 for managing requests for input streams associated with network streams received from a network interface is illustrated in accordance with various embodiments. The system 100 includes a first network interface 102, a second network interface 103 (optional), a stream manager 104, a memory 106 and application(s) 108. According to the illustrated embodiment, the stream manager 104 includes an association table 110.

The first network interface 102 and the second network interface 103 receive information from a network, respectively. For example, the network interfaces 102, 103 may consist of an interface for receiving and transmitting IP streams, such as an SFP interface (e.g., SFP28 interface). The network interfaces 102, 103 may connect to a fiber optic cable or copper cable, or it could be a wireless connection. Each of the first network interface 102 and the second network interface 103 receive network streams from multiple different network streams that can include video data, audio data and/or ancillary data. Depending on the embodiment, the two network interfaces 102, 103 can be connected to the same network or to different networks. In one embodiment, the network interfaces 102, 103 can be provided in a standalone device connected to a host system to which the stream manager 104 is also connected. In other embodiments, the network interfaces 102, 103 can include the stream manager 104.

A network stream may consist of a stream of data packets such as an Internet Protocol (IP) stream. Each network stream includes a network stream identifier used to identify the network stream. Depending on the embodiment, the network stream identifier may include any one of or combination of an Internet Protocol (IP) address, a Media Access Control (MAC) address, a User Datagram Protocol (UDP) port number, and a payload identification number, for example.

The network stream may include video data, audio data and/or ancillary data represented according to various formats, standards or protocols. The video may be transmitted in compressed or uncompressed format. The audio, video and ancillary data may be carried within the same stream or as separate streams. For example, the video data, audio data and/or ancillary data may be represented according to a SMPTE 2110 standard.

Memory 106 may comprise one or more memory devices, which may be on a host computer or on a peripheral card. The memory devices may be integrated in other devices (e.g., in the FPGA) or may be discrete devices.

According to various embodiments, the applications 108 are software applications, for example, video editing applications that perform various operations on a video stream. The system 100 can include a single application or multiple applications depending on the embodiment. In operation, the applications 108 send requests for input streams including video data, audio data and/or ancillary data. In various embodiments, an application may consist of a video processing application that receives one or more input video streams, performs the various operations on the one or more video streams (such as scaling, mixing, etc.) and outputs one or more output video streams. For example, in the case of video data, a request for an input stream may consist of a request to capture one or more video frames for the input stream. In some embodiments, a request includes an input stream identifier identifying the input stream and a network stream identifier identifying a network stream to be received for the input stream.

Depending on the embodiment, the stream manager 104 can be implemented in software, hardware or a combination of software and hardware. According to some embodiments, the stream manager is implemented using an FPGA programed to operate as described herein to receive requests for input streams and to associate the input streams with areas of memory based on the network stream identifiers included in the requests.

According to the illustrated embodiment, the association table 110 has a structure that includes a table entry for each network stream that is requested in any request for an input stream. A unique network stream identifier is provided for each network stream. Further, according to the illustrated embodiment, there is a single table entry for each network stream and corresponding network stream identifier along with any input streams for which a request was received for the network stream identified by the network stream identifier. Each table entry also includes an identification of the area of memory where the network stream identified by the table entry is stored. These embodiments allow multiple input streams to employ the same data from the same source, that is, the same location in memory.

Embodiments can employ the preceding approach to process requests for data from multiple network streams. According to the embodiment illustrated in FIG. 1, any quantity of network streams 1 through M, where M is a positive integer, can be included in the association table 110. Further, any quantity of input streams 1 through N can be included in each table entry of the association table 110. FIG. 1 illustrates a first table entry 112 including a "table entry stream identifier (1)", an identification of an "area of memory (1)" and one or more "input stream (1)". For purposes of this description, the suffix "1" identifies the fact that each of these entries is associated with a "network stream (1)" and the first table entry 112. A table entry can include any number N of input streams, where N(1) represents the number of input streams included in the first table entry 112. In practice, the area of memory (1) is a unique area of memory in which the data included in network stream (1) is stored for retrieval for the associated input streams.

In the illustrated embodiment, the applications 108 include a first application and a second application where the first application performs operations on data included in a first input stream (1) and the second application performs operations on data included in a second input stream (1) and where the data for each of the first input stream and the second input stream includes data included in network stream (1). The first application provides a request to the stream manager 104 for the first input stream. The second application provides a request to the stream manager 104 for the second input stream. Where the first application provides a request to the stream manager 104 for the first input stream (1) and the second application provides a request to the stream manager 104 for the second input stream (1) both associated with a same network stream identifier (1), a table entry 112 is included in the association table 110 by the stream manager 104.

The system 100 illustrated in FIG. 1 allows for the association of multiple network streams with areas of memory storage and the input streams that request the data from any of the network streams.

Each of the table entries, for example, the "table entry (i)" including "table entry stream identifier (i)", "area of memory (i)" and one or more "input stream (i)", includes information associated with a "network stream (i)". The area of memory (i) is a unique area of memory in which the data included in network stream (i) is stored for retrieval for the associated input streams. For example, the first application performs operations on data included in a first input stream (i) and the second application performs operations on data included in a second input stream (i) where the data for each of the first input stream (i) and the second input stream (i) includes data included in network stream (i). Where the first application provides a request to the stream manager 104 for the first input stream (i) and the second application provides a request to the stream manager 104 for the second input stream (i) both associated with a same network stream identifier (i), a table entry (i) is included in the association table 110 by the stream manager 104.

In one embodiment, the system 100 can be included as an integral part of a host system such as a general purpose computer. In other embodiments, one or more elements illustrated in FIG. 1 are provided as an accessory to a host system. For example, in one embodiment, the stream manager 104 is provided as an accessory to an existing host system to improve a performance and functionality of video editing application(s) operating on the host system. In a further embodiment, the network interface 102 and stream manager 104 are included in a network interface card that is installed in an existing host system.

1. Overall Process: Associating an Input Stream and an Area of Memory

In general, the system 100 operates with the stream manager 104 receiving the requests for input streams from the one or more of the applications 108. For each request for an input stream, the stream manager associates the input stream with an area of memory based on the network stream identifier associated with the input stream. When an incoming network stream having an incoming network stream identifier matching the network stream identifier is received from the network interface, the network stream is stored in the associated area of memory. When a request to retrieve the input stream is received, the stored network stream is retrieved from the associated area of memory. The overall process is described below in a situation where a match is found between the network stream identifier included in a first request for a first input stream and in a second request for a second input stream:

A. Stream manager 104 receives a first request for a first input stream, the first request including a first network stream identifier associated with the first input stream;

B. Stream manager 104 receives a second request for a second input stream, the second request including a second network stream identifier associated with the second input stream;

C. With each of the first network stream identifier and the second network stream identifier known, the stream manager 104 determines whether there is a match between the second network stream identifier and the first network stream identifier;

D. If the stream manager 104 identifies a match between the second network stream identifier and the first network stream identifier, the stream manager 104 associates the second input stream and the first input stream with a common area of memory;

E. When an incoming network stream having an incoming network stream identifier matching the network stream identifier is received from the network interface, the incoming network stream is stored in the area of memory associated with the matched network stream identifier, which in this case is the common area of memory associated with both the first input stream and the second input stream; and F. When a request to retrieve the first input stream or a request to retrieve the second input stream is received by the stream manager 104, the stored network stream is retrieved from the area of memory associated with the input stream, which is the common area of memory associated with both the first input stream and the second input stream.

In the above circumstances, where a network stream having a matching network stream identifier is received from the network interface, the network stream is stored in the associated common area of memory and the stored network stream can be retrieved from the associated common area of memory for the input stream and each of the one or more existing input streams. Thus, the network stream can be written once to a single common area of memory associated with multiple input streams associated with a same network stream identifier and the stored network stream can then be retrieved from this common area of memory for any of these multiple input streams as required.

There is no limit to the quantity of input streams that can be associated with the same network stream identifier, for example, see table entry 112 and first input stream (1) through $N^{th}$ input stream (1). Further, the process operates to address situations where an existing stream includes a previously requested input stream, that is, an input stream for which a request was previously received by the stream manager. The process also operates to address situations in which a network stream identifier does not match an existing network stream identifier. In these latter situations, the stream manager associates the input stream with a "new" area of memory that is a different area of memory from that associated with the one or more existing input streams. That is, if a match is not found at act D, the stream manager 104 associates the second input stream with a different area of memory from the first input stream. Thereafter, when a first incoming network stream with a first incoming network stream identifier that matches the first network stream identifier is received and a second incoming network stream with a second incoming network stream identifier that matches the second network stream identifier is received, the two incoming network streams are stored in the associated different areas of memory.

2. Background: Selection of a Master Input Stream from Among Multiple Input Streams Associated with the Same Network Stream Identifier Because a request for an input stream is received by the stream manager 104 in advance of receiving the network stream identified by a network stream identifier included in the request, multiple options exist to allocate memory. In particular, variations are available concerning the temporal (or timing) of the allocation in an overall process. Thus, the approach employed to allocate areas of memory for the storage of data included in a network stream can vary depending on the embodiment. In some embodiments, the allocation of memory for an input-stream request occurs when the request for an input stream is received by the stream manager 104. In other embodiments, for example, where full virtualization is employed, the allocation of memory for an input-stream request is deferred until the network stream is received by the network interface 102.

3. Overall Process: Employing a Master Input Stream to Select an Area of Memory for a Network Stream In an approach where the allocation of memory for an input-stream request occurs when the request for an input stream is received by the stream manager 104, one input stream can be selected as a master input stream relative to any other input streams ("matching streams") that include the same network stream identifier. According to this approach, the area of memory allocated for the input stream that is selected as the master is relied on to store the network stream identified by the network stream identifier of the master input-stream. Requests for any other input streams that include the same network stream identifier as that of the master input stream are also fulfilled by retrieving the network stream from the memory allocated for the input stream that is selected as the master. A "master stream-matching stream" approach can be employed to improve system reliability (by having multiple input streams "listen to" the most reliable master stream) and performance, as is described in greater detail below. These master-matching approaches according to some embodiments include the following process.

A. The process begins with the stream manager 104 allocating a first area of memory for a first input stream;

B. The stream manager 104 receives a first request for the first input stream, the first request including a first network stream identifier associated with the first input stream;

C. The stream manager 104 allocates a second area of memory for a second input stream;

D. The stream manager 104 receives a second request for the second input stream, the second request including a second network stream identifier associated with the second input stream;

E. With each of the first network stream identifier and the second network stream identifier known and corresponding areas of memory allocated, the stream manager 104 determines whether there is a match between the second network stream identifier and the first network stream identifier;

F. If the stream manager 104 identifies a match between the second network stream identifier and the first network stream identifier, the stream manager 104 associates the second input stream and the first input stream with a common area of memory;

According to this embodiment, the process also includes the following:

G. Selecting a master stream from among the first input stream and the second input stream;

H. If the first input stream is selected as the master stream, when an incoming network stream having an incoming network stream identifier that matches the network stream identifier (common to each of the first input stream and the second input stream) is received from the network interface, the incoming network stream is stored in an area of memory allocated at act A for the first input stream;

I. If the second input stream is selected as the master stream, when an incoming network stream having an incoming network stream identifier that matches the network stream identifier (common to each of the first input stream and the second input stream) is received from the network interface, the incoming network stream is stored in an area of memory allocated at act C for the second input stream;

J. Following acts H and I, when a request to retrieve the first input stream or a request to retrieve the second input stream is received by the stream manager 104, the stored network stream is retrieved from the area of memory associated with the input stream, which in this case is the associated common area of memory, allocated in accordance with acts H and I and the selection of a master input stream.

According to some embodiments, the acts A and C are both completed in advance of the act B. That is, a first area of memory is allocated for the first input stream and a second area of memory different than the first area of memory is allocated for the second input stream in advance of receiving either the first input-stream request or the second input-stream request.

In the above circumstances, where a network stream having a matching network stream identifier is received from the network interface, the network stream is stored in the associated area of memory that is allocated for the master input stream. The stored network stream can be retrieved from the associated common area of memory for each of the one or more existing input streams. Here too, the network stream can be written once to a single common area of memory associated with multiple input streams associated with a same network stream identifier and the stored network stream can then be retrieved from this common area of memory for any of these multiple input streams as required.

There is also no limit to the quantity of input streams that can be associated with the same network stream identifier in the case of an allocation of memory based on a selection of a master input stream. Thus, any quantity of input streams 1 through N can be associated with a single network stream identifier and with an associated common area of memory where the network stream is stored and selected when one of the plurality of input streams is designated as a master input stream.

Embodiments allow for a selection of the master that can change dynamically when a master input stream requests the network-stream data stored in memory before other input streams associated with the same area of memory request the data. The process also operates to address situations in which a network stream identifier does not match an existing network stream identifier at act F. In these latter situations, the stream manager associates the second input stream with the second allocated area of memory (allocated for the second input stream at act C) where the second allocated area of memory is different than the first allocated area of memory (allocated for the first input stream at act A) associated with the first input stream. The process also operates to address the situations in which a master stream ceases to be associated with a network stream identifier that is also associated with other input streams. In these situations, the stream manager 104 selects a new master stream among these other input streams.

4. Detailed Process: Operation of Stream Manager with Association Tables

FIG. 2 illustrates further details of a system to manage multiple input stream requests for a single network stream in accordance with one embodiment. This system has particular utility where captured data included in a network stream is stored in a single area of memory for use by multiple input streams that process the same data from the same network stream. Such embodiments enable the allocation of memory, the storage of network stream data to a single area of memory and the subsequent retrieval of the stored network stream data from the single area of memory for use by the different input streams. Regarding the terminology employed in the descriptions of FIGS. 2-4: a) an input stream can include any one of or any combination of a video stream, an audio stream and a stream of ancillary data; b) each input stream is identified by an input stream index; c) the input stream is associated with data for one or more frames of the corresponding video, audio or ancillary data streams, respectively; d) a surface corresponds to one or multiple frames of a stream and is uniquely identified by a surface index denoted by a "surface ID" (here, the term "surface" refers to an area of memory, see FIG. 1); e) each network stream is identified with a unique network stream identifier denoted "network stream ID".

FIG. 2 illustrates a system 200 for managing requests for input streams associated with network streams received from a network interface. The system 200 includes a first network interface 202, a second network interface 203 (optional), a stream manager 204, a memory 206 and an application 208. According to the illustrated embodiment, the stream manager 204 includes a plurality of tables including Table A, Table B and Table C. According to some embodiments, the Tables A, B and C represent elements included in the association table 110 of FIG. 1.

Table A can also be referred to as the "SurfaceID to allocated surface table". In the illustrated embodiment, Table A includes a list of SurfaceIDs and the corresponding address of the allocated surface. Thus, each entry in Table A includes the SurfaceID and the address of the surface (or area of memory) that is allocated to the SurfaceID. Table B can be referred to as a "SurfaceID to associated surface table". In the illustrated embodiment, Table B includes a list of SurfaceIDs and the address of the associated surface. Thus, each entry in Table B includes the SurfaceID and the address of the surface (or area of memory) that is associated with the SurfaceID. Table B is included to support the dynamic associations between an address in memory that is initially assigned a given surface and an address in memory where the data corresponding to the surface is found and accessed for multiple input streams. As is described herein, support for a system that stores captured data from a network stream in a single area of memory for use by multiple input streams that process the same data means that only one of the allocated surface addresses is used for each incoming network stream. The retrieval of the same network stream data for any other surface that requires access must be directed to an address that can differ from the address allocated for these other surface(s).

Table C can also be referred to as a "Network stream ID to SurfaceID table". In the illustrated embodiment, Table C includes a list of Network stream IDs and the corresponding set of SurfaceIDs associated with the network stream in that table entry. Thus, each entry in Table C includes the Network stream ID and the set of SurfaceIDs that are associated with the Network stream ID. Table C is included in the stream manager 204 to support the dynamic association of different SurfaceIDs with a same network stream identifier. Further, the processes illustrated and described with reference to FIGS. 2 and 3 can be employed with any quantity of: input streams; allocated surfaces; SurfaceIDs and Network stream IDs as is described herein.

Table C includes an additional column "Set of timestamps" illustrated in phantom. According to some embodiments, timestamps that identify a location in a network stream are employed to provide an operation that allows a change in the network stream provided to an input stream without interruption. These approaches which can be referred to as "make-before-break" are described in greater detail with reference to FIG. 4. In an alternative approach referred to as "break-before-make," timestamps are not employed in the preceding manner. However, even in these alternative approaches described with reference to FIGS. 3A-3E, timestamp information can be provided for each input stream included in a table entry. Here, the timestamp information may be used, for example, to select a master stream from among a plurality of input streams associated with a network stream (alone or in addition to other master selection criteria).

Further, some embodiments include multiple "Network stream ID to SurfaceID" tables, for example, as shown in phantom in FIG. 2. These embodiments may provide two different sets of table entries for associations between Surface IDs and Network stream IDs. According to some embodiments, the two sets of table entries are identical except for the network stream IDs which could be different; for example, in the embodiment illustrated in FIG. 3C, the network stream C(202) for a first Table C is provided via the first network interface 202 and the network stream C(203)

for a second Table C is provided via the second network interface 203 for the same network streams.

Figure 3A:
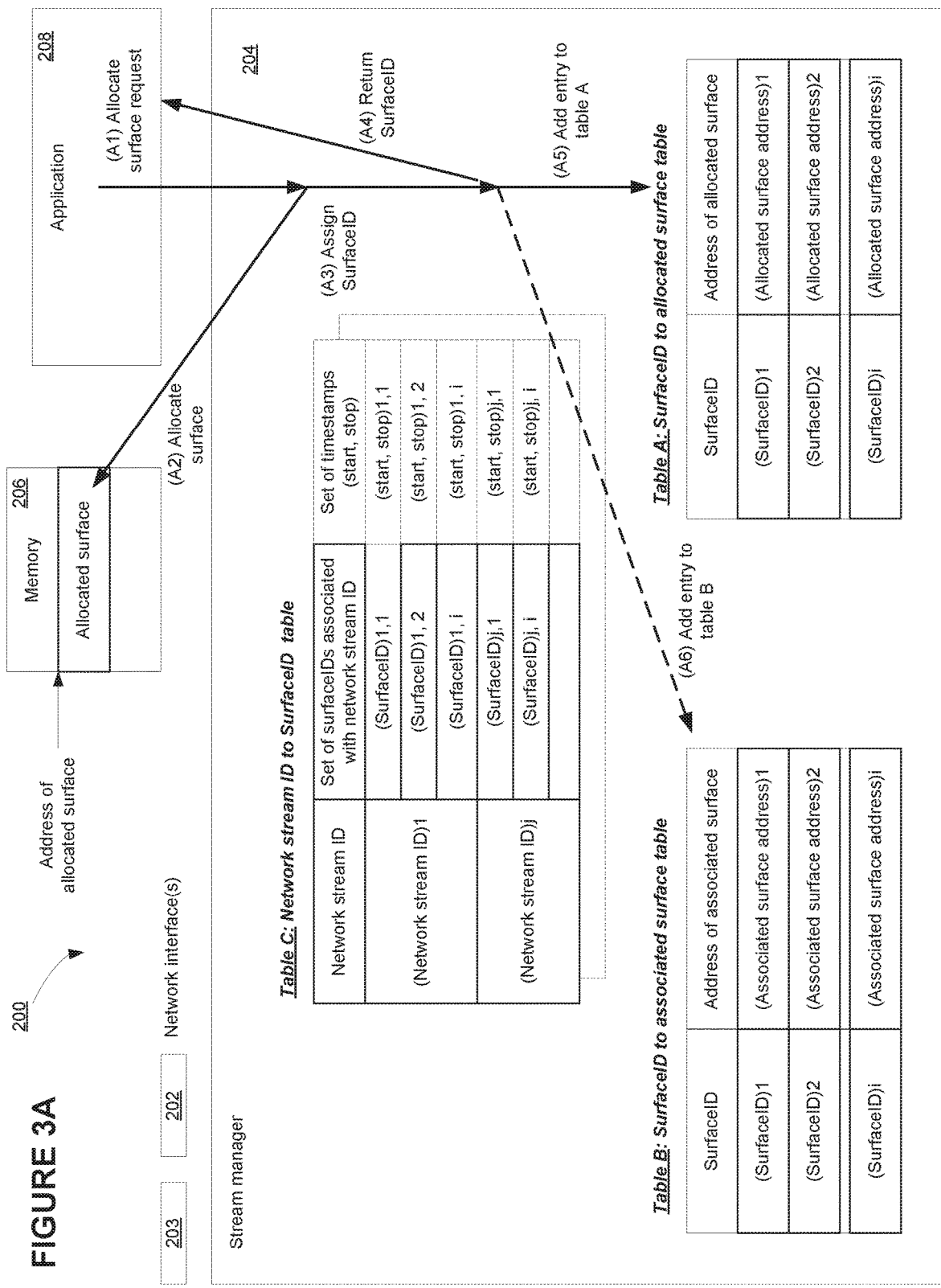
Figure 3B:
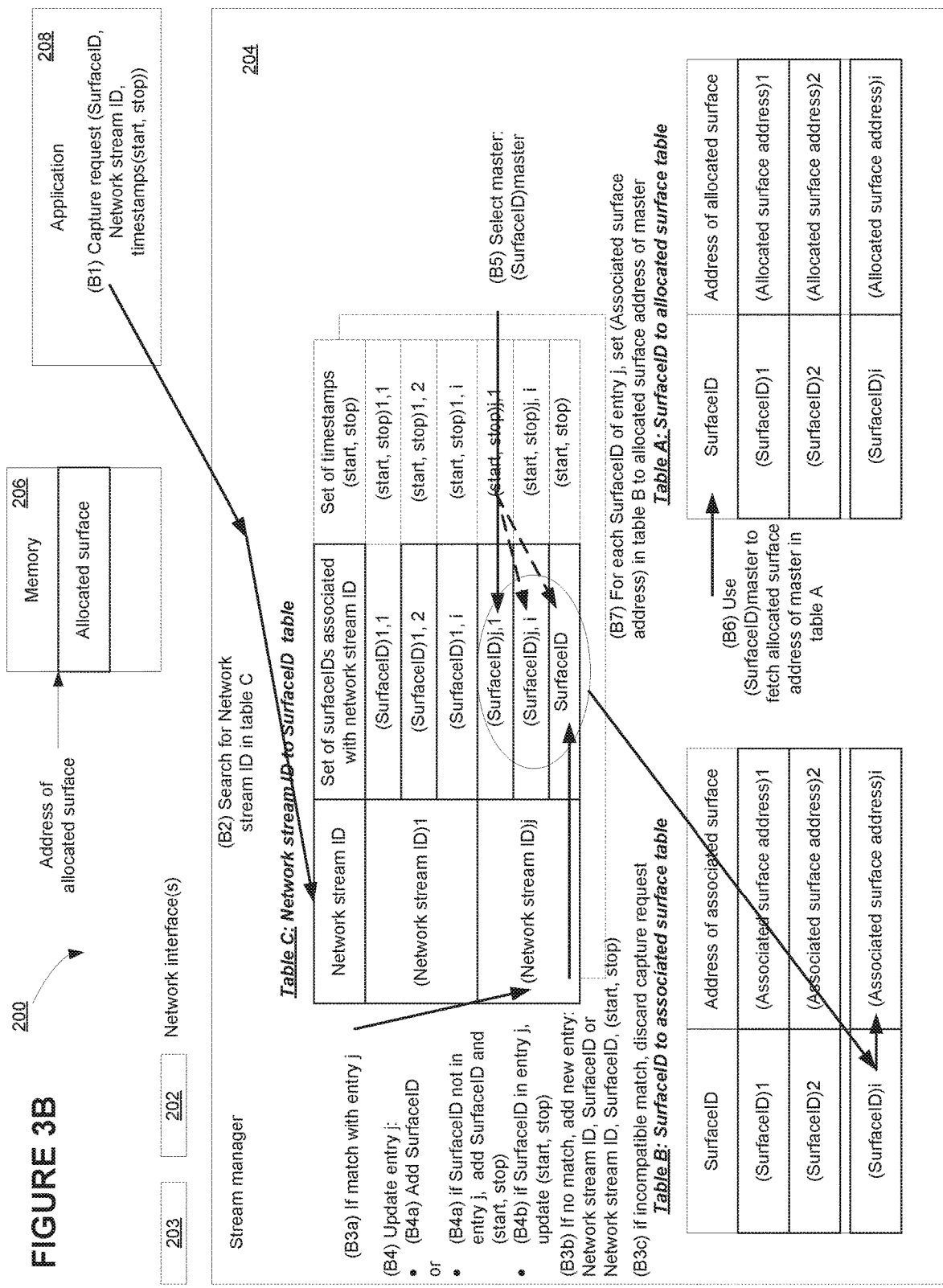
Figure 3D:
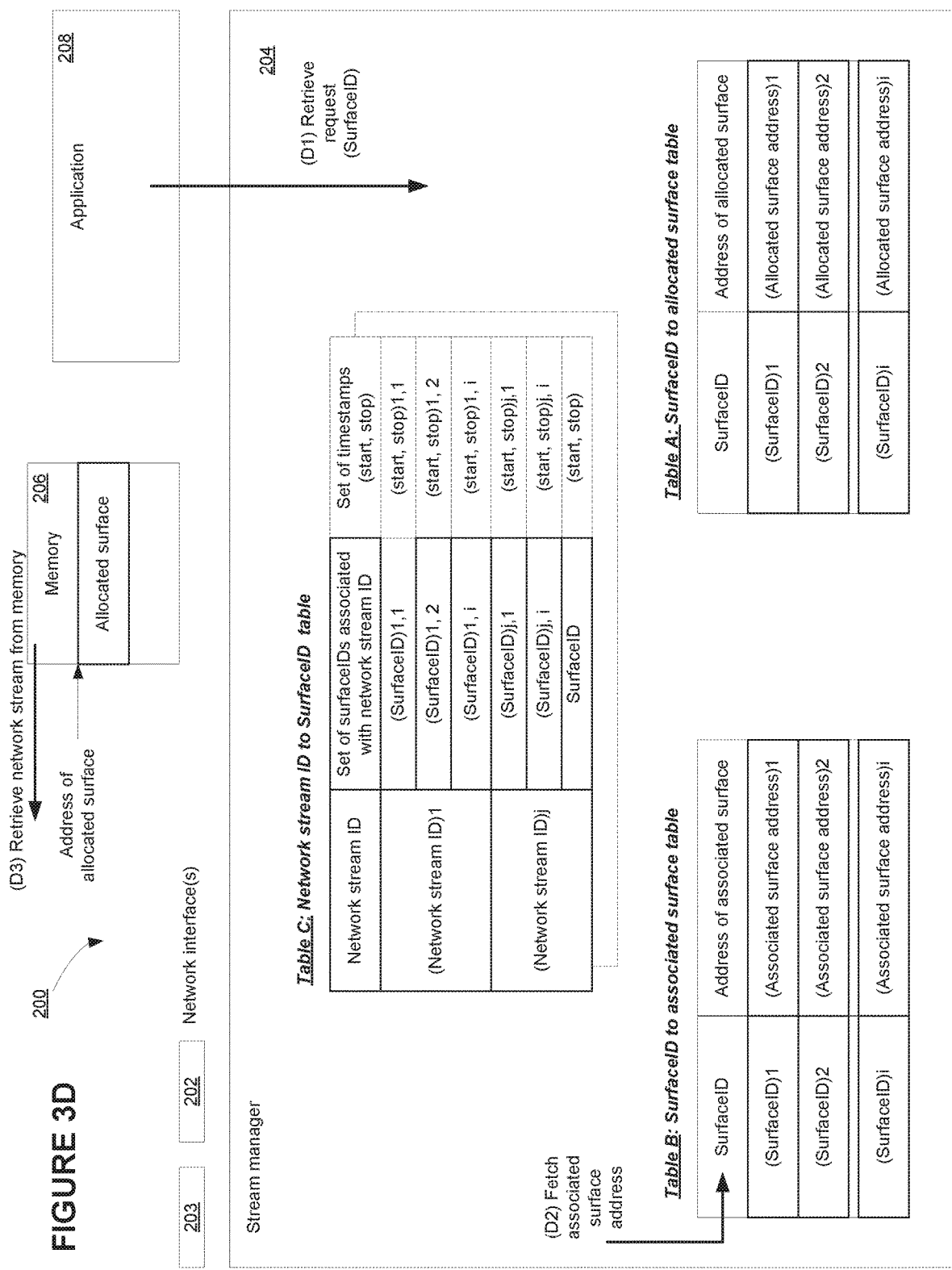
Figure 3E:
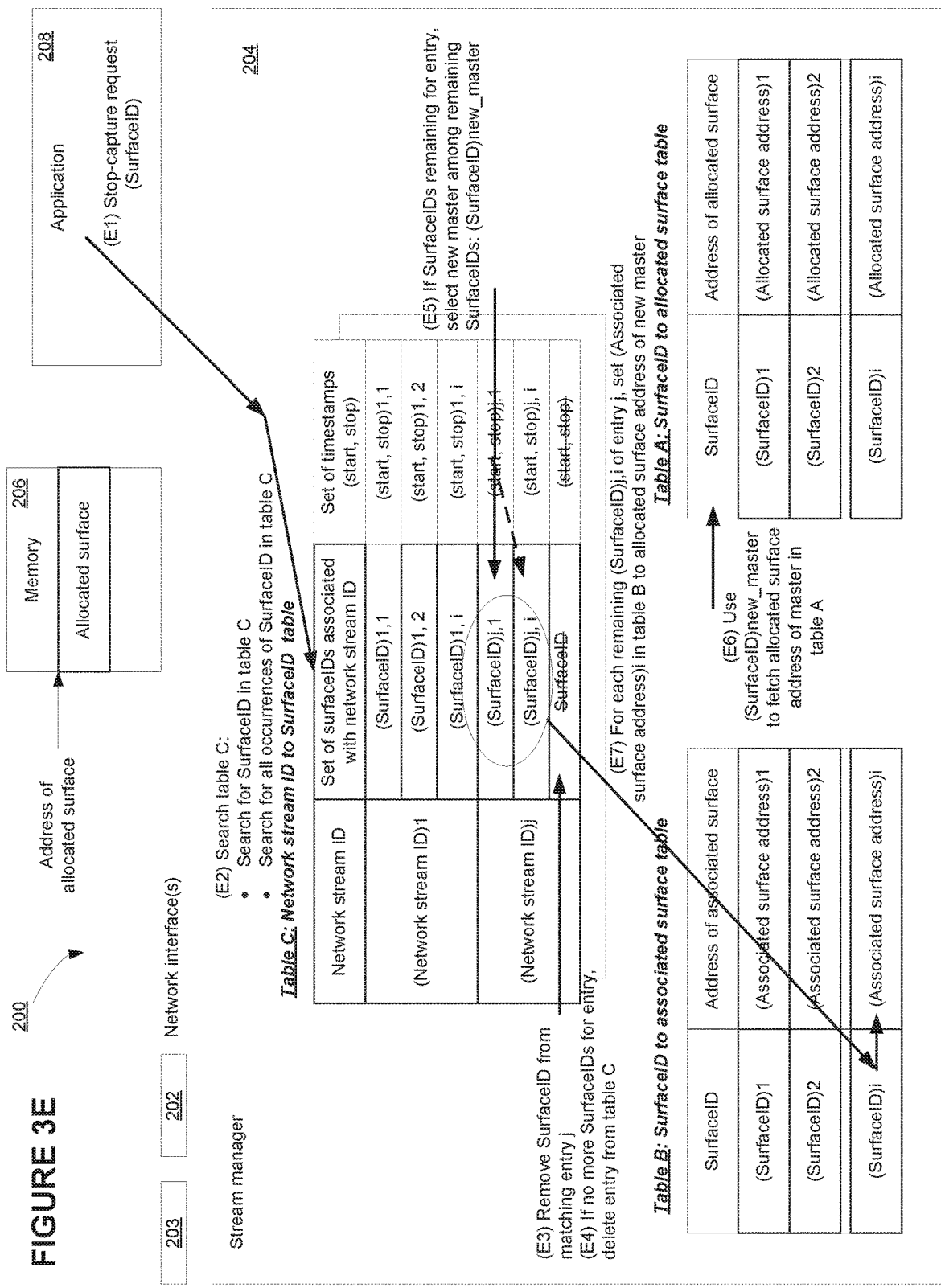

FIGS. 3A-3E illustrate FIG. 2 annotated with different process flows, respectively, employed for processing network streams in various embodiments. These figures provide a conceptual framework to describe embodiments of a system to manage multiple input stream requests for a single network stream in greater detail. Generally, FIGS. 3A-3E each illustrate one aspect of an overall process that includes: a first process flow A (FIG. 3A), a second process flow B (FIG. 3B), a third process flow C (FIG. 3C), a fourth process flow D (FIG. 3D) and a fifth process flow E (FIG. 3E). According to the illustrated embodiment, the first process flow A includes steps in a process for allocating a surface; the second process flow B illustrates steps for processing a capture request; the third process flow C illustrates steps in a process for receiving an incoming network stream; the fourth process flow D illustrates a process for retrieving a network stream for an input stream; and the fifth process flow E illustrates steps for processing a stop-capture request.

More specifically and according to the illustrated embodiment, FIGS. 3A-3E each illustrate one aspect of an overall process: the first process flow A adds a surface (SurfaceID) for an input stream and allocates an address for the surface in Table A (FIG. 3A); the second process flow B processes a capture request that includes a SurfaceID and a Network stream ID, searches for the Network stream ID in Table C, and associates the SurfaceID with an address in memory in Table B (FIG. 3B); the third process flow C processes an incoming network stream including an incoming network stream ID, searches for the incoming network stream ID in Table C, fetches the address of the associated surface from Table B and stores the incoming network stream at the address in the memory 206 (FIG. 3C); the fourth process flow D processes a request to retrieve a surface identified by a SurfaceID, fetches the address of the associated surface from Table B and retrieves the network stream from the address in memory 206 (FIG. 3D); and the fifth process flow E processes a request to stop a previously entered capture that includes a SurfaceID, removes the SurfaceID from Table C and further updates Tables B and C, as required.

FIG. 3A illustrates a first process flow A according to one embodiment. In the illustrated embodiment, the first process flow A includes an act of receiving a request for allocation of a surface (act A1), an act of allocating a surface (act A2), an act of assigning a SurfaceID (act A3), an act of returning a SurfaceID (act A4), an act of adding an entry to table A (act A5) and optionally an act of adding an entry to table B (act A6). The first process flow A is initiated at act A1 with a request for an input stream, for example, from the application 208. The stream manager 204 receives the request and at act A2 allocates a surface in the memory 206 for the newly requested input stream. With the address of the allocated surface in the memory 206 known, the stream manager 204 assigns a corresponding SurfaceID at the act A3. For example, an (input stream)1 can be allocated (allocated surface address)1 and assigned (SurfaceID)1. An (input stream)2 can be allocated (allocated surface address)2 and assigned (SurfaceID)2 with any quantity of input streams 1 through i having surfaces allocated and identified similarly.

According to the illustrated embodiment, the process flow A continues with the stream manager 204 returning the SurfaceID for the allocated surface to the application 208 at act A4. The process flow A also adds a corresponding table entry to Table A at act A5. In this example, the table entry for (input stream)1 includes (SurfaceID)1 and (allocated surface address)1. Similarly, the table entry for (input stream)2 includes (SurfaceID)2 and the (allocated surface address)2 with each of input streams 1 through i having table entries in the same form. According to the illustrated embodiment, the process flow A includes the optional act A6 of adding an entry to Table B. For example, the entry for (input stream)1 includes assigned (SurfaceID)1 and (associated surface address)1, which is an associated (rather than allocated) surface address. According to this approach, the table entry in Table B takes the same form as the corresponding table entry in Table A.

Some embodiments do not include the process of allocating a surface (act A2) or perform this allocation process at another moment, for example, on receipt of a capture request.

FIG. 3B illustrates a second process flow B according to one embodiment. In the illustrated embodiment, the second process flow B includes an act of receiving a capture request including a SurfaceID and Network stream ID (act B1), an act of searching Table C for the Network stream ID (act B2), identifying a match for the Network stream ID (generally act B3), an act of adding the SurfaceID to the table entry for the Network stream ID (generally act B4), an act of selecting a master from among the plurality of SurfaceIDs in the table entry for the Network stream ID (act B5), an act of fetching the address of the allocated surface for the master from Table A (act B6) (or Table B since for the master the associated address is the same as the allocated address), and the act of updating the associations in Table B for each of the SurfaceIDs identified in the table entry for the Network stream ID in Table C (act B7).

According to the illustrated embodiment, the act B3 includes three different process steps that are completed in the alternative: an act B3a if a matching entry is found in Table C; an act B3b if a match is not found in Table C; and an act B3c if an incompatible match is found in Table C, in which case the capture request would be discarded. An example of this scenario would be a timestamp range that is not consistent with the ones already added in the set of timestamps (start, stop).

Similarly, the act B4 includes two different process steps completed in the alternative: an act B4a adding an entry if the SurfaceID is not already associated with the Network stream ID; and an act B4b updating an existing entry if the SurfaceID is already associated with the Network stream ID.

By associating the SurfaceID with the address of an area of memory where the data from the network stream will be found, the application 208 is able to eventually retrieve the data when needed. The preceding is true even where the data is stored in an area of memory other than the area allocated for the input stream. The act B1 occurs when the application 208 sends a capture request for an input stream where the capture request includes the SurfaceID and the Network stream ID. Here, the application 208 may request data from a video stream that is communicated to the network interface 202 where the network stream including the video is identified by a network stream ID. The preceding is followed by the act B2 where Table C is searched to determine whether the Network stream ID included in the capture request is already included in a table entry in Table C. Where a match exists, at the act B3a, the process flow B allows the SurfaceID of the current capture request to be included in the set of SurfaceIDs associated with the network stream ID. Alternatively, if a match is not found, the process flow B proceeds to the act B3b and adds a new table entry including a Network stream ID, SurfaceID and a timestamp.

Where a match exists, at the act B3a, the process flow B proceeds to act B4 where the table entry for the Network stream ID is updated. The act B4 can be completed in one of two ways in accordance with the illustrated embodiment, depending on whether timestamps are employed. If timestamps are not employed, the table entry is updated at act B4 with the addition of the SurfaceID to the corresponding table entry in Table C. If timestamps are employed, two different process steps are completed in the alternative: If the SurfaceID is not already included in the table entry for the Network stream ID, the SurfaceID is added to the table entry with the set of timestamps at the act B4a; alternatively, for a SurfaceID already included in the table entry for the Network stream ID, the table entry of the SurfaceID is updated with the timestamps for the SurfaceID included in the capture request.

According to some embodiments, a master SurfaceID is selected among the SurfaceIDs included in the table entry for the Network stream ID at act B5 and the allocated surface address for the master SurfaceID is designated for storage of the network stream when it is received. To associate the allocated surface address for the master SurfaceID with the other Surface IDs in the table entry, the allocated surface address for the master SurfaceID is retrieved from Table A at act B6. This information is then used, at act B7, to update the table entries in Table B for each of the other Surface IDs in the same table entry as the master SurfaceID in Table C: more specifically, for each SurfaceID included in the same table entry as the master SurfaceID in Table C, the (Associated surface address) of the SurfaceID in Table B is set to match the (Allocated surface address) of the master StreamID in Table A.

Various criteria can be used to select the master stream from a plurality of input streams associated with a particular network stream identifier, that is, to select a master StreamID from among all the Surface IDs included in a table entry for a particular Network stream ID in Table C. According to one embodiment, the criteria can include a selection hierarchy based on one or more of: the start timestamp included in a SurfaceID table entry; the redundancy, if any, provided for a particular SurfaceID as detailed below; or other factors including either or both of the preceding in combination with one another and other criteria. According to one embodiment, the master is selected as the SurfaceID that has a start timestamp resulting in the SurfaceID starting its capture first among the SurfaceIDs included in the table entry. According to one embodiment, the master stream is selected using a "redundancy-over-no-redundancy" criterion. For an entry (j) (network stream identifier (j)) of Table C, there may be more than one master selected, one for each timestamp range without overlap.

FIG. 3C illustrates a third process flow C according to one embodiment. In the illustrated embodiment, the third process flow C includes an act of receiving an incoming network stream identified with an incoming network stream ID (act C1), an act of searching Table C for the incoming network stream ID (act C2), an act of identifying a match between the incoming network stream ID of the incoming network stream with an entry in Table C (act C3), an act of fetching from Table B the address of the surface associated with the master SurfaceID (SurfaceID of the master input stream) for the table entry in Table C (act C4) and an act of storing the incoming network stream in memory 206 at the surface address associated with the master SurfaceID retrieved from Table B (act C5). In summary, the third process flow C provides for storage of a network stream to be captured when it is received. In particular, the newly received data is stored in a location in memory that has a known association with the master input stream.

The reliability of the systems 100, 200 described herein can be improved by providing redundancy to ensure that the capture of network streams is not interrupted by a failure of an element in the system 100, 200. FIGS. 2, 3A-3E and 4 illustrate embodiments that include both the first network interface 202 and the second network interface 203. For example, FIG. 3C illustrates an example where data from the same network stream can be received by both the first network interface 202 and the second network interface 203. In FIG. 3C, a first network stream C(202) is received by the first network interface 202 and the second network stream C(203) is received by the second network interface 203. In the illustrated embodiment, the stream manager 204 includes multiple "Network stream ID to SurfaceID" tables. These embodiments provide two different sets of table entries for associations between SurfaceIDs and Network stream IDs. The two sets of table entries are identical except for the network stream ID which could be different, that is, the network stream C(202) for a first Table C is provided via the first network interface 202 and the network stream C(203) for a second Table C is provided via the second network interface 203 for the same network streams. The redundancy provided by this embodiment can provide an uninterrupted processing of a network stream even with a failure of one of the network interfaces 202, 203.

FIG. 3D illustrates a fourth process flow D according to one embodiment. In the illustrated embodiment, the fourth process flow D includes an act of sending a retrieval request including a SurfaceID for retrieving a network stream (including frames of streamed data) stored at a surface identified by the SurfaceID (act D1), an act of fetching the address associated with the SurfaceID from Table B (act D2) and an act of retrieving the network stream from memory 206 using the address associated with the SurfaceID identified at the act D2 (act D3). As previously mentioned with reference to the second process flow B, the application 208 is able to retrieve specific network stream data from memory 206 when needed because of the manner in which the stream manager 204 manages the storage location of network streams and tracks the SurfaceID(s) associated with the network streams. The preceding is true even when the location in memory is a surface that is allocated to one input stream but includes data for a network stream that was requested by multiple input streams.

FIG. 3E illustrates a fifth process flow E according to one embodiment. In the illustrated embodiment, the fifth process flow E includes an act of receiving a stop-capture request including a SurfaceID for stopping a capture for streamed data identified by the SurfaceID (act E1), an act of searching Table C for the SurfaceID identified at the act E1 (act E2), and removing the SurfaceID identified at the act E2 from Table C (act E3). Following the act E3, the fifth process flow E proceeds to the act E4 of deleting the table entry that included the SurfaceID identified at the act E1 from Table C, if there are no other SurfaceIDs associated with the table entry. Alternatively, if there are other SurfaceIDs remaining in the table entry, the fifth process flow E proceeds to the acts E5-E7: selecting a new SurfaceID as a master from among the remaining SurfaceIDs of the table entry (act E5); searching Table A for the address that was previously allocated for the SurfaceID of the newly-selected master (act E6); and for each of the remaining SurfaceIDs of the table entry of Table C (the table entry that previously included the SurfaceID that was removed at the act E3), associating the SurfaceID in Table B with the address allocated for the newly-selected master (act E7). In the embodiment described and illustrated with reference to FIG. 3E, a new master is selected at the act E5 regardless of whether the SurfaceID that was removed at the act E3 was the master or not; however, in other embodiments, acts E5-E7 are only performed if the SurfaceID that was removed at the act E3 was the master.

The fifth process flow E is initiated at act E1 with a stop-capture request including the SurfaceID of the capture request. The stop-capture request can, for example, originate from the application 208. Here, the application may initiate a stop-capture request because a different video stream communicated from the network interface 202 will be processed rather than a previously requested video stream. The stream manager 204 receives the stop-capture request and, at act E2, searches Table C for the SurfaceID identified in the stop-capture request. In one of the illustrated embodiments, the act E2 includes a search for all occurrences of the SurfaceID identified in the stop-capture request. Where multiple occurrences are identified, the following acts E3-E7 are repeated for each occurrence to stop all captures for the SurfaceID. For each table entry identified, the stream manager 204 removes the Surface ID from the table entry at the act E3. The stream manager 204 also reviews the table entry to determine whether it includes any other SurfaceIDs. If the table entry does not include any other SurfaceIDs, the fifth process flow E moves to the act E4 and deletes the entire table entry. The fifth process flow E is completed at the act E4 in the preceding circumstances. However, if one or more surface IDs remain in the table entry, the fifth process flow E moves to the act E5 where one of the remaining SurfaceIDs is selected as the master. In these circumstances, the stream manager 204 must now update the address association in Table B for all of the SurfaceIDs included in the newly modified table entry of Table C. To do so, the stream manager searches Table A to identify the address of the surface allocated in memory for the new master at the act E6. Then, at the act E7, the stream manager 204 updates Table B by associating each of the SurfaceIDs with the address allocated for the new master.

According to the process illustrated and described with reference to FIGS. 3A-3E, the capture of data in a first network stream identified by a first network stream identifier must be stopped before the capture of data in a second network stream (identified by a different network stream identifier) can begin for the same input stream. This process can be referred to as a "break-before-make" process. An alternative approach is to process the network streams using a "make-before-break" approach. According to these embodiments, a stream manager is configured to employ timestamps alone or in combination with other approaches to allow for a stream-capture for a first Network stream ID to be started and then be replaced by a stream-capture for a second Network stream ID and to do so without an interruption of the input stream.

Figure 4:
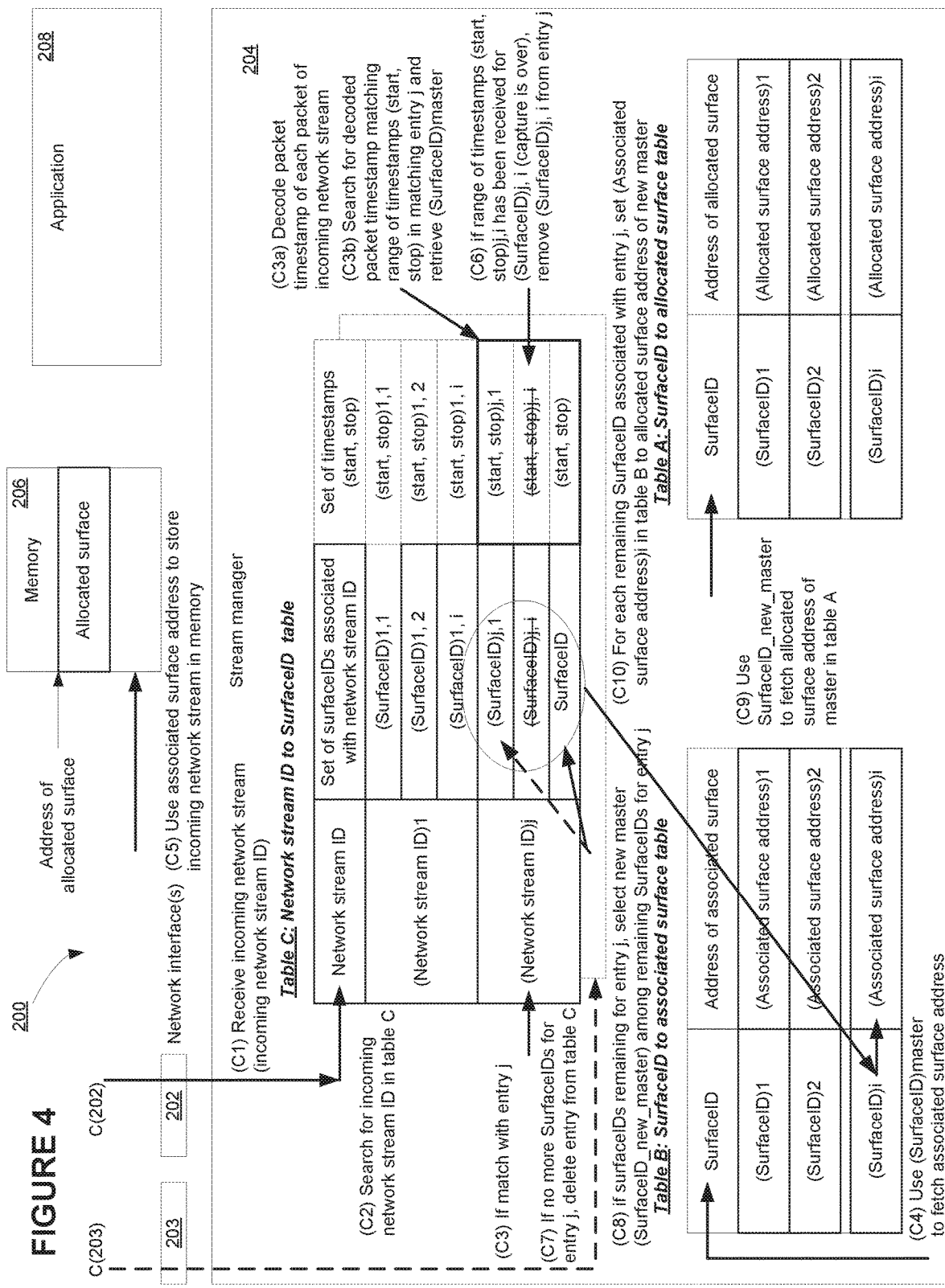
FIG. 4 illustrates the system of FIG. 2 including a process flow in accordance with another embodiment.

Referring now to FIG. 4, an alternate embodiment of the third process flow C is illustrated. In general, the illustrated embodiment differs from the embodiment illustrated and described with reference to FIG. 3C in the use of timestamps. In particular, timestamps are employed to provide a process that deletes an association between a network stream and a SurfaceID in a table entry when the incoming network stream for a range of timestamps in the SurfaceID entry has been received.

In the embodiment illustrated in FIG. 4, the third process flow C includes an act of receiving an incoming network stream identified with an incoming network stream ID (act C1), an act of searching Table C for the incoming network stream ID (act C2), an act of identifying a match between the incoming network stream ID of the incoming network stream with an entry in Table C (act C3), an act of fetching from Table B the address of the surface associated with the master Surface ID (SurfaceID of the master input stream) for the table entry in Table C(act C4), an act of storing the incoming network stream in memory 206 at the surface address associated with the master SurfaceID of the master input stream (act C5). According to the illustrated embodiment, the act C3 includes multiple acts including an act of decoding packet timestamps of each packet of the incoming network stream (act C3a) and an act of searching for the timestamps of the table entry for the incoming network stream that match the decoded timestamps of the incoming network stream (act C3b).

In addition, in the embodiment illustrated in FIG. 4, the third process flow C includes an act of removing a SurfaceID included in the table entry for the Network stream ID if the range of timestamps for the SurfaceID are already received indicating that the capture for that range of timestamps is over (act C6) and an act of deleting the entire table entry for any Network stream ID that no longer has an associated SurfaceID (act C7). If there are remaining SurfaceIDs for the table entry, the third process flow C includes: an act of selecting a new master SurfaceID from among the remaining SurfaceIDs for the table entry (act C8); an act of searching Table A for the address allocated for the new master SurfaceID (act C9); and an act of updating in Table B the address associated with each of the other SurfaceIDs in the table entry to reflect the address of the new master (at C10). In some embodiments, acts C8 through C10 are only performed if the removed SurfaceID was not a master.

In summary, the third process flow C illustrated in FIG. 4 provides for storage of a network stream to be captured when it is received while also providing for the removal of SurfaceIDs that have completed capture even where a stop-capture request (fifth process flow E) is not initiated. It also enables a clean transition of the capture for an input stream from one network stream to a different network stream (different network stream ID) without disruption or any missing data. These embodiments may also dynamically select a new master stream when a SurfaceID is deleted from the table entry of a Network Stream ID.

Note that, in the embodiments described above with reference to FIG. 2 through FIG. 4, to change a network stream associated with an input stream from one network stream ID to another, two options are described. Either the application can request a new SurfaceID, do the transition and then delete the first SurfaceID or, alternatively, the application can request and hold two or more surfaceIDs and cycle between them.

As mentioned above, operation of the stream manager 104, 204 can be controlled by code, for example, firmware provided for a peripheral device or the host system depending on the embodiment. Depending on the embodiment, the stream management code can be software running on a general purpose processor, firmware programed in a configurable hardware device such as an FPGA or a combination of both of the preceding. For example, in one embodiment, the application(s) 108, 208 run on the CPU included in the host system while the stream-management code runs on a local processor of a peripheral device that includes the network interface 102, 202 where the peripheral device is connected with the host via a host interface. In another embodiment, the application(s) and the stream management code run on the CPU of the host computer.

One or more memory elements are employed to store the streams and the association tables described above. In one embodiment, the memory elements are local to the peripheral device that includes the network interface. In another embodiment, host memory is used. The systems 100, 200 described herein include a memory interface and controller such as a DMA controller used to store and retrieve data from memory and a memory controller in charge of memory housekeeping (refresh, error correction, etc.). Further, an interface is provided between the application 108, 208 and the stream manager 104, 204, respectively. For example, embodiments including a host and a peripheral device can include a host-to-peripheral interface such as PCI or PCI express bus.

Embodiments of the invention can include capture circuitry that provides the components to achieve the processes illustrated in FIGS. 3C and 4, respectively. In one embodiment, the capture circuitry operates to: compare the incoming network stream ID against the contents of Table C to identify the table entry index j; (optionally) decode timestamp information that may include, for example, any of actual RTP timestamps, time of day (packet arrival time), RTP markers, etc.; compare against entry j to identify the master StreamID for this optional timestamp; and fetch the associated surface address. In some embodiments in which a master stream is selected, the stream manager 104, 204 employs the capture circuitry associated with the master stream for receiving the incoming network stream.

The embodiments described above may be implemented in hardware, software, firmware, or any combination thereof. For example, they may be implemented in one or more computer programs executing on a programmable computer including a processor, a storage medium readable by the processor (including, for example, volatile and non-volatile memory and/or storage elements). According to some embodiments, the program code may be downloaded from a remote resource, for example, from a remote server accessed via the cloud over a wide area network such as the Internet.

Depending on the embodiment, the computer programs within the scope of the embodiments described herein may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Methods and associated acts in the various embodiments of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer, host systems or related accessories as well as other computers suitable for executing computer programs implementing the methods described herein.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for managing requests for input streams associated with at least one incoming network stream received from a network interface, the input streams including at least one of video data, audio data and ancillary data, the method comprising:
   receiving a request for an input stream, the input stream associated with a network stream identifier;
   determining whether the network stream identifier associated with the input stream matches an existing network stream identifier, the existing network stream identifier associated with at least one existing input stream;
   if a match is found, associating the input stream and the at least one existing input stream with a common area of memory;
   if a match is not found, associating the input stream with a first area of memory that differs from a second area of memory that is associated with the at least one existing input stream; and
   if the match is found:
      receiving from the network interface an incoming network stream having an incoming network stream identifier matching the existing network stream identifier and storing the incoming network stream in the common area of memory;
      retrieving the stored network stream from the common area of memory for the input stream; and
      retrieving the stored network stream from the common area of memory for an existing input stream included in the at least one existing input stream.

2. The method of claim 1, further comprising, if the match is found, selecting a master stream among the input stream and the at least one existing input stream.

3. The method of claim 2, further comprising selecting one of the at least one existing input stream as the master stream.

4. The method of claim 2, further comprising selecting the input stream as the master stream.

5. The method of claim 2, further comprising:
   allocating a different area of memory for the input stream and each of the at least one existing input stream, respectively, and
   selecting an area of memory allocated for the master stream as the common area of memory.

6. The method of claim 2, further comprising selecting the master stream using a master selection criterion including at least one of: a timestamp criterion and a redundancy-over-no-redundancy criterion.

7. The method of claim 2, further comprising:
   receiving from the network interface an incoming network stream having an incoming network stream identifier matching the existing network stream identifier and storing the incoming network stream in the common area of memory; and using capture circuitry associated with the master stream for receiving the incoming network stream.

8. The method of claim 2, wherein the master stream ceases to be associated with the existing network stream identifier, the method further comprising:

selecting a new master stream among a remaining at least one existing input stream associated with the existing network stream identifier.

9. The method of claim 1, wherein the network stream identifier includes at least one of: an Internet Protocol (IP) address, a Media Access Control (MAC) address, a User Datagram Protocol (UDP) port number, and a payload identification number.

10. The method of claim 1, further comprising:

receiving a request for at least one of the at least one existing input stream from a first application having a first memory addressing space; and receiving the request for the input stream from a second application having a second memory addressing space, the second addressing space different than the first addressing space.

11. The method of claim 1, wherein the existing network stream identifier is one of a plurality of existing network stream identifiers, wherein the at least one existing input stream is one of a plurality of at least one existing input stream each associated with a respective one of the plurality of existing network stream identifiers, wherein the second area of memory is one of a plurality of areas of memory each associated with a respective one of the plurality of at least one existing input stream and wherein the method further comprises:

determining whether the network stream identifier associated with the input stream matches one of the plurality of existing network stream identifiers, if the match is found, identifying a matched one of the plurality of existing network stream identifiers and associating the input stream and the at least one existing input stream associated with the matched one of the plurality of existing network stream identifiers with the common area of memory, and if the match is not found, associating the input stream with the first area of memory that differs from each of the plurality of areas of memory, respectively.

12. The method of claim 1, wherein the input stream ceases to be associated with the network stream identifier, and wherein the method further comprises:

removing the input stream from a list of input streams associated with the network stream identifier; and if there are no remaining input streams associated with the network stream identifier, removing the network stream identifier from a list of existing network stream identifiers.

13. The method of claim 1, wherein the match is found, wherein the request for the input stream is a first request, wherein the network stream identifier is a first network stream identifier, and wherein the method further comprises:

receiving a second request for the input stream, the input stream associated with a second network stream identifier that differs from the first network stream identifier; and associating the input stream with a third area of memory that differs from the common area of memory.

14. The method of claim 13, further comprising removing the association between the input stream and the common area of memory after associating the input stream with the third area of memory.

15. The method of claim 13, further comprising removing the association between the input stream and the common area of memory before associating the input stream with the third area of memory.

16. The method of claim 1, wherein the match is found, wherein the request for the input stream is a first request, wherein the network stream identifier is a first network stream identifier, wherein the existing network stream identifier is a first existing network stream identifier, wherein the at least one existing input stream is a first at least one existing input stream, wherein the common area of memory is a first common area of memory, and wherein the method further comprises:

receiving a second request for the input stream, the input stream associated with a second network stream identifier that differs from the first network stream identifier;

determining whether the second network stream identifier associated with the input stream matches a second existing network stream identifier, the second existing network stream identifier associated with a second at least one existing input stream;

if a second match is found, associating the input stream and the second at least one existing input stream with a second common area of memory; and if a second match is not found, associating the input stream with a third area of memory that differs from the first common area of memory and from a fourth area of memory that is associated with the second at least one existing input stream.

17. A non-transitory computer-readable medium comprising computer program instructions executable by at least one computer processor to perform a method of managing requests for input streams associated with at least one incoming network stream received from a network interface, the input streams including at least one of video data, audio data and ancillary data, the method comprising:

receiving a request for an input stream, the input stream associated with a network stream identifier;

determining whether the network stream identifier associated with the input stream matches an existing network stream identifier, the existing network stream identifier associated with at least one existing input stream;

if a match is found, associating the input stream and the at least one existing input stream with a common area of memory;

if a match is not found, associating the input stream with a first area of memory that differs from a second area of memory that is associated with the at least one existing input stream; and if the match is found:

receiving from the network interface an incoming network stream having an incoming network stream identifier matching the existing network stream identifier and storing the incoming network stream in the common area of memory;

retrieving the stored network stream from the common area of memory for the input stream; and retrieving the stored network stream from the common area of memory for an existing input stream included in the at least one existing input stream.

18. The non-transitory computer-readable medium of claim 17, the method further comprising, if the match is found, selecting a master stream among the input stream and the at least one existing input stream.

19. The non-transitory computer-readable medium of claim 18, the method further comprising selecting one of the at least one existing input stream as the master stream.

20. The non-transitory computer-readable medium of claim 18, the method further comprising selecting the input stream as the master stream.

21. The non-transitory computer-readable medium of claim 18, the method further comprising:
allocating a different area of memory for the input stream and each of the at least one existing input stream, respectively, and
selecting an area of memory allocated for the master stream as the common area of memory.

22. The non-transitory computer-readable medium of claim 18, the method further comprising selecting the master stream using a master selection criterion including at least one of: a timestamp criterion and a redundancy-over-no-redundancy criterion.

23. The non-transitory computer-readable medium of claim 18, the method further comprising:
receiving from the network interface an incoming network stream having an incoming network stream identifier matching the existing network stream identifier and storing the incoming network stream in the common area of memory; and
using capture circuitry associated with the master stream for receiving the incoming network stream.

24. The non-transitory computer-readable medium of claim 18, wherein the master stream ceases to be associated with the existing network stream identifier, the method further comprising:
selecting a new master stream among a remaining at least one existing input stream associated with the existing network stream identifier.

25. The non-transitory computer-readable medium of claim 17, wherein the network stream identifier includes at least one of: an Internet Protocol (IP) address, a Media Access Control (MAC) address, a User Datagram Protocol (UDP) port number, and a payload identification number.

26. The non-transitory computer-readable medium of claim 17, the method further comprising:
receiving a request for at least one of the at least one existing input stream from a first application having a first memory addressing space; and
receiving the request for the input stream from a second application having a second memory addressing space, the second addressing space different than the first addressing space.

27. The non-transitory computer-readable medium of claim 17, wherein the existing network stream identifier is one of a plurality of existing network stream identifiers, wherein the at least one existing input stream is one of a plurality of at least one existing input stream each associated with a respective one of the plurality of existing network stream identifiers, wherein the second area of memory is one of a plurality of areas of memory each associated with a respective one of the plurality of at least one existing input stream and wherein the method further comprises:
determining whether the network stream identifier associated with the input stream matches one of the plurality of existing network stream identifiers,
if the match is found, identifying a matched one of the plurality of existing network stream identifiers and associating the input stream and the at least one existing input stream associated with the matched one of the plurality of existing network stream identifiers with the common area of memory, and
if the match is not found, associating the input stream with the first area of memory that differs from each of the plurality of areas of memory, respectively.

28. The non-transitory computer-readable medium of claim 17, wherein the input stream ceases to be associated with the network stream identifier, and wherein the method further comprises:
removing the input stream from a list of input streams associated with the network stream identifier; and
if there are no remaining input streams associated with the network stream identifier, removing the network stream identifier from a list of existing network stream identifiers.

29. The non-transitory computer-readable medium of claim 17, wherein the match is found, wherein the request for the input stream is a first request, wherein the network stream identifier is a first network stream identifier, and wherein the method further comprises:
receiving a second request for the input stream, the input stream associated with a second network stream identifier that differs from the first network stream identifier; and
associating the input stream with a third area of memory that differs from the common area of memory.

30. The non-transitory computer-readable medium of claim 29, the method further comprising removing the association between the input stream and the common area of memory after associating the input stream with the third area of memory.

31. The non-transitory computer-readable medium of claim 29, the method further comprising removing the association between the input stream and the common area of memory before associating the input stream with the third area of memory.

32. The non-transitory computer-readable medium of claim 17, wherein the match is found, wherein the request for the input stream is a first request, wherein the network stream identifier is a first network stream identifier, wherein the existing network stream identifier is a first existing network stream identifier, wherein the at least one existing input stream is a first at least one existing input stream, wherein the common area of memory is a first common area of memory, and wherein the method further comprises:
receiving a second request for the input stream, the input stream associated with a second network stream identifier that differs from the first network stream identifier;
determining whether the second network stream identifier associated with the input stream matches a second existing network stream identifier, the second existing network stream identifier associated with a second at least one existing input stream;
if a second match is found, associating the input stream and the second at least one existing input stream with a second common area of memory; and
if a second match is not found, associating the input stream with a third area of memory that differs from the first common area of memory and from a fourth area of memory that is associated with the second at least existing input stream.

* * * * *